United States Patent [19]

Hibbel et al.

[11] 4,372,253
[45] Feb. 8, 1983

[54] RADIATION BOILER

[75] Inventors: Josef Hibbel; Bernard Schleper; Heinrich Scheve, all of Oberhausen, Fed. Rep. of Germany

[73] Assignee: Ruhrchemie Aktiengesellschaft, Oberhausen, Fed. Rep. of Germany

[21] Appl. No.: 193,698

[22] Filed: Oct. 3, 1980

[30] Foreign Application Priority Data

Oct. 4, 1979 [DE] Fed. Rep. of Germany ....... 2940257

[51] Int. Cl.³ .......................... F22D 1/04; B01D 47/02
[52] U.S. Cl. .................................. 122/7 R; 122/392; 55/222; 55/242; 55/248; 55/260; 55/269; 55/385 R; 55/431; 261/119 R; 261/153
[58] Field of Search ............... 55/222, 242, 244, 248, 55/249, 260, 269, 385 R, 293, 431, 258; 48/69, 77; 261/119 R, 126, 153; 165/95; 110/215; 122/7 R, 8, 390, 392

[56] References Cited

U.S. PATENT DOCUMENTS

| 636,256 | 11/1899 | Gates | 55/222 |
|---|---|---|---|
| 2,028,250 | 1/1936 | Rössner | 165/95 |
| 2,201,650 | 5/1940 | Hallerberg | 55/258 |
| 2,818,135 | 12/1957 | White | 261/119 R |
| 3,131,237 | 4/1964 | Collins, Jr. | 261/153 |
| 3,841,060 | 10/1974 | Hoad | 55/431 |
| 3,880,597 | 4/1975 | Goldschmidt et al. | 55/431 |
| 4,253,853 | 3/1981 | Caesar | 55/242 |

FOREIGN PATENT DOCUMENTS

| 1118799 | 12/1961 | Fed. Rep. of Germany | 122/7 R |
|---|---|---|---|
| 1960909 | 6/1971 | Fed. Rep. of Germany | 165/95 |
| 2705558 | 8/1978 | Fed. Rep. of Germany | 48/77 |
| 726744 | 3/1955 | United Kingdom | 165/95 |

*Primary Examiner*—David L. Lacey
*Attorney, Agent, or Firm*—Sprung, Horn, Kramer & Woods

[57] ABSTRACT

An improvement in a radiation boiler for cooling a gas stream containing solid and molten particles wherein gas is introduced vertically via a gas feed at the top of a radiation boiler having a cooled gas outlet and a water bath disposed at the bottom thereof for removing the particles after they have been solidified and cooled. Between the gas feed and the water bath are disposed at least two concentrically arranged cylindrical tubular heat exchange elements vertically disposed in the boiler and forming at least one annular passage therebetween. The passage through the innermost heat exchange element is in fluid flow registry and fluid flow communication with the gas feed. A conical deflector has the axis thereof coincident with that of the innermost heat exchange element and thereby in registry with the flow of gas passing through the passage through the innermost heat exchange element and is disposed toward the bottom of the radiation boiler above the water bath but at least partially below the lower end of the innermost heat exchange element, whereby gas which strikes the conical surface of the conical deflector is deflected and passes through the at least one annular passage and in the passage of the innermost heat exchange element.

7 Claims, 2 Drawing Figures ness, it nevertheless causes a considerable reduction in the heat transfer.

As soon as the liquid ash droplets enter the water bath, solid ash having a relatively low bulk density is preferentially formed. In order to be able to keep the dimensions of the discharge locks from the pressure system as small as possible, an attempt is made to obtain coarse-grained and relatively dense ash. The formation of coarse-grained ash is also advantageous for the distribution of the total ash into low carbon content coarse ash and carbon-containing fine ash, as the fine ash is returned to the gasification process. Finally, it would also be noted that according to the known method the enthalpy of the liquid ash is almost completely lost.

RADIATION BOILER

BACKGROUND OF THE INVENTION

1. Field of the Invention

The present invention relates to a radiation boiler which serves in particular to recover the process heat produced during the gasification of ash-forming, carbonaceous fuels.

2. Discussion of the Prior Art

The utilization of this energy is absolutely essential for reasons of economy in all those cases in which the gas can be used without otherwise utilizing the sensible heat or enthalpy.

The production of steam with the aid of heat generated in the process is, however, as a rule particularly difficult if liquid ash particles are entrained in the gas phase, as is typically the case in certain gasification processes carried out under pressure, e.g. processes involving hard coal or ash-forming petroleum. Additional problems arise on account of the fact that the ash has, depending on the feedstock material, a varying composition and thus varying physical properties, which places particular requirements on the construction of a waste heat recovery plant.

German Offenlegungsschrift 27 05 558, corresponding to U.S. application Ser. No. 876,446 filed Feb. 9, 1978 and now abandoned, and Ser. No. 130,643 filed Mar. 17, 1980 and now U.S. Pat. No. 4,310,333 both of which are commonly assigned with this application and the disclosures of which are hereby incorporated herein by reference, describes a method for the gasification of solid fuels in which the reaction gas together with the combustion residues are cooled in a radiation boiler arranged directly beneath the reactor to such an extent that the liquid combustion residues, which are entrained by the gas as fine droplets, solidify before they reach a convection boiler connected downstream. The combustion residues occurring in the form of coarse agglomerates are precipitated in a water bath arranged in the lower part of the radiation boiler when the gas stream containing the residues is deflected at the surface of the said water bath.

In this known method the ash is largely precipitated out, the reaction mixture being pre-cooled. The temperature of the particles remaining in the gas is lowered to such an extent that sintering on the heat exchanger surfaces is prevented. Heat transfer predominantly occurs by means of radiation. Direct contact between the liquid ash and the heat exchanger wall is excluded since the diameter of the central space is chosen sufficiently large in relation to the inlet opening for the gas and the length of the heat exchanger elements. In a second cooling stage, connected to the radiation boiler, the heat transfer essentially takes place by means of convection. Although the known method for heat recovery has proved itself in practice, it is still capable of improvement with respect to certain aspects. Thus, although the degree or precipitation of the ash is more than 90% and is thus surprisingly high, a further improvement in the ash precipitation is desired. Moreover, heat transfer is prevented by a very loose, continuous layer of ash a few millimeters thick on the heat exchanger surfaces even when liquid ash does not reach the wall. Although this layer of ash comes away locally from the heat exchanger surfaces as soon as it reaches a certain thick-

SUMMARY OF THE INVENTION

Accordingly, this invention contemplates an improvement in the radiation of a boiler for cooling and gas stream containing solid and molten particles comprising feed means for introducing said gas vertically at the top of said radiation boiler, a water bath disposed at the bottom of said radiation boiler for removing said particles after they had been solidified and cooled, said improvement residing in that there is disposed between said feed means and said water bath at least two concentrically arranged heat exchange elements, the annular passage of the inner heat exchange element being in fluid registry with said feed means, a conical deflector disposed in registry with the flow of gas passing through said annular passage disposed toward the bottom of said radiation boiler above said water bath but at least partially below the lower edge of the vertical wall of said inner heat exchange elements whereby gas, which strikes said conical deflector, is caused to pass both upwardly in said annular passage and in the ring shaped passage between heat exchange elements.

The present invention obviates the aforementioned disadvantages. The invention comprises a radiation boiler for cooling a gas stream containing solid and molten particles that is introduced vertically at the top of the radiation boiler, wherein the said particles, after they have cooled and solidified are removed by a water bath located in the lower part of the radiation boiler. The radiation boiler according to the invention characterized in that it contains two or more concentrically arranged, cylindrical heat exchanger elements, through the innermost one of which and through the annular spaces formed by the outer surface of an inner heat exchanger element and the inner surface of the next outer heat exchanger surface, the gas stream flows from the top downwardly after having undergone one or more deflections, in that the surfaces of the individual heat exchanger elements are cleaned with the aid of process gas introduced under elevated pressure through nozzles, and in that it contains a conical impact member centrally arranged above the water bath and designed as a heat exchanger element and having a nozzle system for cleaning with water.

The radiation boiler according to the invention contains two or more concentrically arranged, cylindrical heat exchanger elements. The arrangement of a plurality of heat exchanger elements ensures an improved recovery of the process heat as a result of the increased heat exchange surface.

If only one heat exchanger element is used, only the inside of this heat exchanger element can be used to remove heat since the heat exchanger element also has the task of protecting the pressure-carrying outer wall of the radiation boiler from thermal stress.

If two or more concentrically arranged, cylindrical heat exchanger elements are incorporated, the outside of an inner heat exchanger element as well as the inside of the next outer heat exchanger element are utilized to cool the gas stream after the latter has undergone one or more deflections, and accordingly the surface available for heat transfer is more than doubled compared with the case where only one heat exchanger element is incorporated.

The usual equipment known in the art, e.g., plate coolers, can be used as the heat exchanger element. Heat exchanger elements constructed by assembling fin-type tubes to form a fin wall and used in boiler construction in power stations have proved particularly suitable. The pie system of the fin wall can be charged with any suitable cooling agent, preferably wayer or saturated steam. When using saturated steam, the fin-type tubes must be made of $H_2S$-resistant material in order to prevent corrosion, which can occur at elevated temperatures.

The gas flows downwardly through the innermost heat exchanger element and gives up its heat to the inner surface of this heat exchanger element. After having been deflected it then flows upwardly again and transmits its heat by radiation to the outer surface of the inner heat exchanger element concentrically arranged around the said inner heat exchanger element. Depending on the number of heat exchanger elements employed, the gas is deflected one or more times in the system.

The gas stream is deflected by means of the water bath arranged in the lower part of the radiation boiler, in conjunction with the centrally incorporated conical impact member and by deflection plates that are secured to the respective heat exchanger element and are immersed in the water bath. The gas stream flowing from the bottom upwardly is deflected again by means of a cooled deflection plate connecting in each case two heat exchanger elements. The gas flowing from the top downwardly is re-deflected by the water bath arranged in the lower part of the radiation boiler and by deflection plates that are secured to the respective heat exchanger element and are immersed in the water bath.

The centrally arranged conical impact member is designed on the basis of a fin-type wall as a heat exchanger element and preferentially traps the downwardly falling, fairly large liquid ash and thereby additionally provides process steam. The ash deposited on the cooled conical impact member solidifies in the form of thin lumps, which largely break loose as a result of contraction stresses and slide into the water bath.

This process is assisted by periodically injecting water through a nozzle system arranged above the conical impact member. The surface of the conical impact member is cleaned by additionally spraying the conical impact member with pressurized water. The pressurized water is fed through a suitable number of outlet openings to the surface of the conical impact member to prevent the formation of thick undesirable layers of slag.

In this way a low carbon content, compact ash is produced which can easily be separated from the carbon-containing fine ash that is recirculated to the gasification process. Also, the heat contained in the liquid ash can be utilized to produce process steam. This is directly advantageous when using high ash content, low-grade coal. Since the lumps of ash must pass through the shut-off device of the lock located in the lower part of the water bath, they are advantageously comminuted by a crusher arranged upstream of the shut-off device in order to protect the shut-off device of the lock against individual pieces that are too large.

In industrial operation of the radiation boiler, a considerable reduction in the heat transfer rapidly occurs on account of the heat exchanger surfaces being covered by ash entrained in the gas stream, which impairs the heat removal over the heat exchanger element. This interference in the heat transfer is prevented in accordance with the invention by means of a special cleaning system.

In this connection, the heat exchanger surfaces are blown free by periodically injecting mechanically clean and cooled process gas. A precondition for this surprisingly positive effect having regard to the relatively high gas content in the radiation boiler is a high initial momentum of the gas jet, which is obtained by recompressing about 1% of the process gas to pressures of 50 to 300 bars above the operating pressure of the radiation boiler. In order to improve this cleaning method and to avoid marked pressure variation in the radiation boiler and reactor, the spray system is subdivided into a sufficient number of sections, which are cleaned separately.

An additional, further recovery of process heat from the pre-cooled process gas stream, which merely contains very small amounts of fine ash, is carried out in convection cooling elements connected downstream.

The gas stream follows the following path in the radiation boiler according to the invention:

The gas stream to be cooled passes through the central pipe into the radiation boiler and parallel to the axis thereof, and flows downwardly with only a slight radial component. Fairly coarse, liquid ash particles are thus not entrained and flung to the walls of the heat exchanger elements, but instead preferentially reach the cooled conical impact member. In the upper part of the radiation boiler there is already an intensive heat exchange at the inner wall of the inner heat exchanger element accompanied by a partial back-mixing of the gas stream, both these effects resulting in a marked cooling of the gas stream. The centrally arranged conical impact member is situated in the lower region of the inner heat exchanger element and, in conjunction with the water bath located therein and the deflection plate mounted on the next following heat exchanger element and immersed in the water bath, causes the gas stream to be deflected, whereupon the ash particles entrained in the gas stream are hurled into the water bath. As a result of incorporating the conical impact member, the flow cross-section is reduced, resulting in a corresponding increase in the flow velocity of the gas stream.

By suitably dimensioning the annular space between the concentric cylindrical heat exchanger elements, the flow velocity of the gas stream in the upward direction is significantly reduced, resulting in a further lowering of the ash content. The gas stream can be additionally cooled and subjected to further multiple deflections by additionally incorporating extra concentrically arranged cylindrical heat exchanger elements.

The sum total of these measures results in an improvement of the degree of ash precipitation to values of >95% when using a coal feedstock containing about 6% of ash.

BRIEF DESCRIPTION OF THE DRAWINGS

Referring to the annexed drawings.

DESCRIPTION OF SPECIFIC EMBODIMENTS

Figure 1:
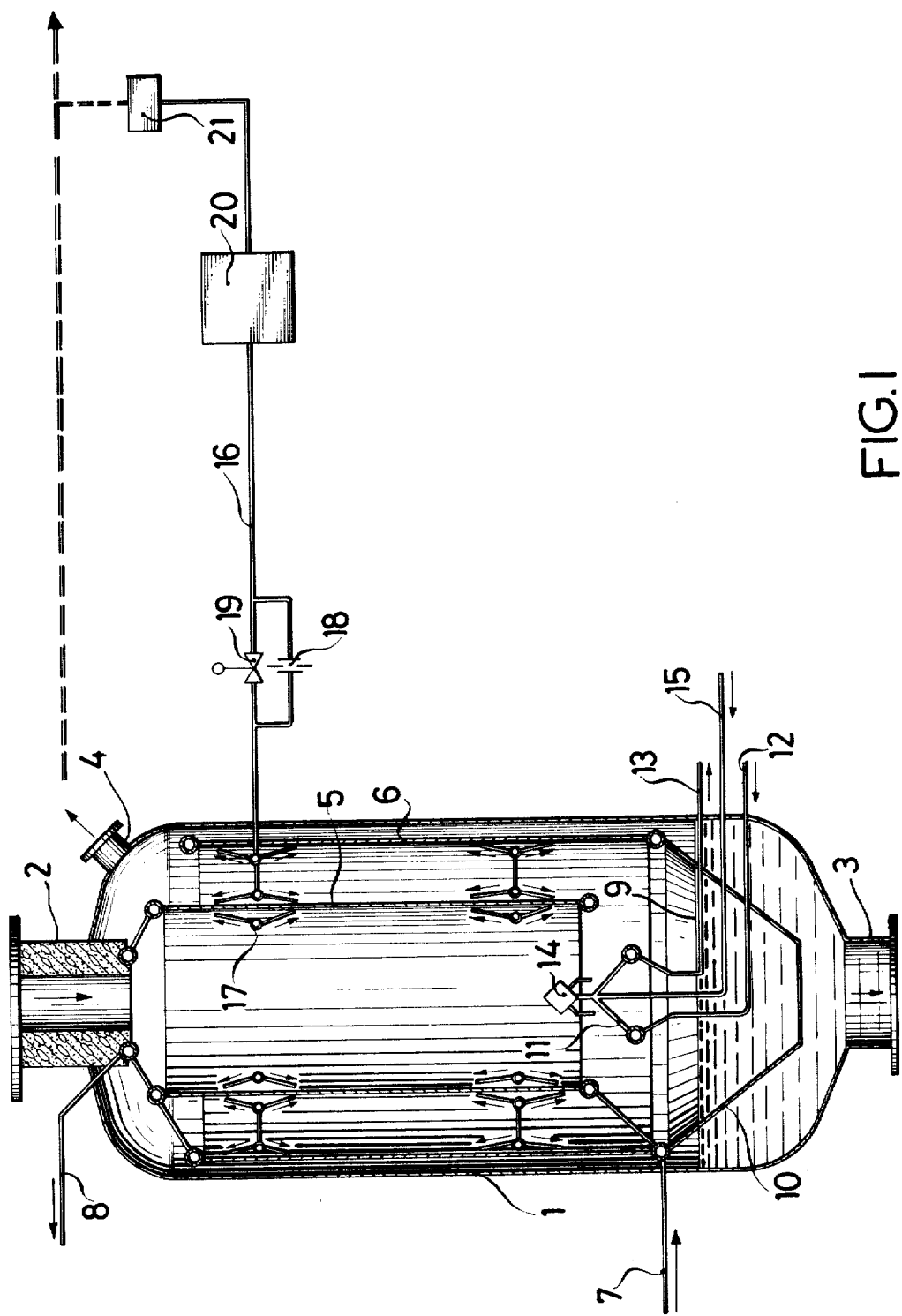
FIG. 1 is a side view, partially in section, of an apparatus pursuant to the invention

A design and construction of the radiation boiler which is characteristic of the invention and as illustrated in FIG. 1 is described in more detail hereinafter. The reference number 1 denotes a pressure-bearing outer wall which is rotationally symmetrical with respect to the mid-axis of the radiation boiler. A gas stream to be cooled passes through a refractory lined inlet pipe 2 into the radiation boiler. The gas is first of all cooled on the inner surface of an inner heat exchanger element 5. It then passes to a centrally arranged conical impact member 11 on which the fairly coarse liquid ash is deposited and cooled. In order to assist in the cleaning of the conical impact member 11, a nozzle system 14 connected to a supply of water is arranged above the conical impact member. A water bath 9 in the lower part of the radiation boiler receives the ash particles from the gas stream which have been hurled into the bath by the deflecting forces, and also receives the compact ash originating from the conical impact member.

The ash suspended in the water bath is removed via a discharge pipe 3 which leads via a slag crusher to the ash lock (not shown). A funnel 10 is arranged in the water bath 9, by means of which the solids are guided to the central discharge pipe 3. The centrally arranged conical impact member 11 is supplied with cooling water via a line 12, and the process steam produced is removed via a line 13. The built-in nozzle system 14 for cleaning the conical impact member 11 is provided with water via a line 15. The concentrically arranged cylindrical heat exchanger elements 5 and 6 receive their cooling medium through one or more feed lines 7. The process steam derived from the heat exchanger elements is removed via one or more lines 8.

The gas stream is deflected at the surface of the water bath 9, and then enters the annular space between the two concentrically arranged cylindrical heat exchanger elements 5 and 6. The gas stream is cooled in the upward direction both on the outside of the inner heat exchanger element 5 and also on the inside of the outer heat exchanger element 6. The thus cooled and mechanically pre-purified gas leaves the radiation boiler through one or more cooled outlet pipes and cooled lines 4.

The removal of adhering ash from the heat exchanger surfaces is effected by injecting in process gas through a nozzle system 17 which is connected to a reservoir 20 for process-specific gas and a compressor 21 which operates in the manner of a soot blower. The process gas used for cleaning is fed to the nozzle system via one or more lines 16. To cool the nozzle system 17, the latter is continuously supplied with small amounts of gas from a by-pass 18. The nozzle system 17 can comprise a plurality of nozzle members situated in opposed relationship to the heat exchanger walls so as to operable to discharge high pressure process gas onto the walls of the indirect heat exchange to purge the same of deposited ash. The accompanying drawings show pairs of nozzles within the inner heat exchanger, two pairs disposed toward the top and two pair disposed toward the bottom. Also shown are cooperating nozzles disposed in the space between heat exchangers and directed at the respective surfaces. The drawing does not show all connecting tubing.

Nozzle system 17 is periodically fed via a valve 19 with larger amounts of gas, such as are required for cleaning the individual heat exchanger segments. The high initial momentum of the gas stream required is ensured by the pressure in the reservoir 20, which is 50 to 300 bars above the working pressure of the radiation boiler.

Figure 2:
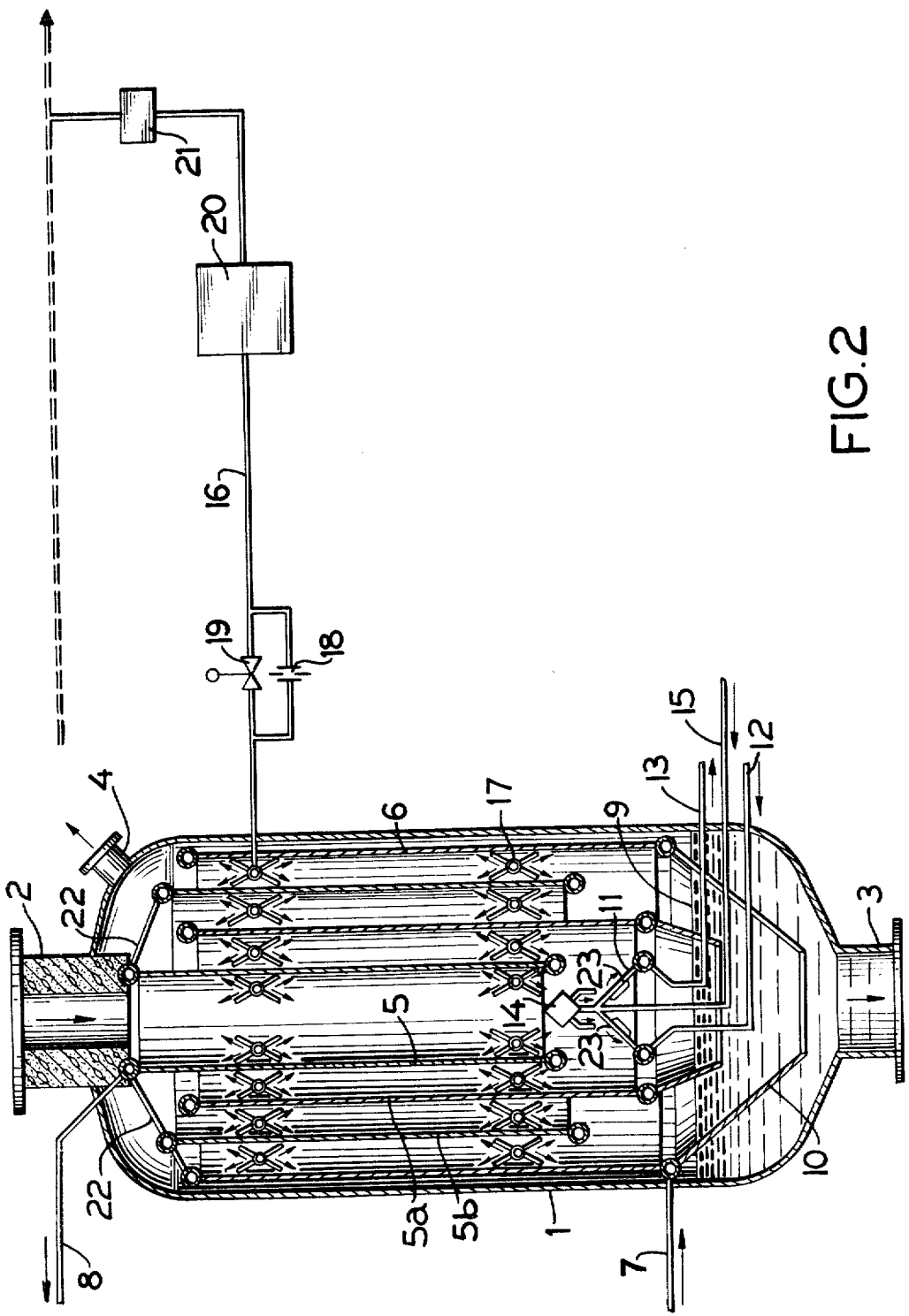
FIG. 2 is a side view, partially in section of an alternative embodiment of the apparatus according to the invention. Indirect heat exchange surfaces are symbolically represented in the Figures by lines including the cross sections of conduits.

FIG. 2 shows a form of construction of the radiation boiler with four heat exchanger elements 5, 5a, 5b and 6. Heat exchanger 22 is an extension of 6. The reference numbers 23 denote outlet openings in the surface of the conical impact member 11, which are fed from within 11 with pressurized water and so serve to wash ash from the surface of the impact member.

What is claimed is:

1. In a radiation boiler for cooling a gas stream containing solid and molten particles, comprising feed means for introducing said gas vertically at the top of said radiation boiler, a cooled gas outlet and a water bath disposed at the bottom of said radiation boiler for removing said particles after they have been solidified and cooled, the improvement wherein there is disposed between said feed means and said water bath at least two concentrically arranged cylindrical tubular heat exchange elements vertically disposed in the boiler and forming at least one annular passage therebetween, the passage through the innermost heat exchange element being in fluid flow registry and fluid flow communication with said feed means, a conical deflector having the axis thereof coincident with that of the innermost heat exchange element and thereby in registry with the flow of gas passing through the passage through the innermost heat exchange element and disposed toward the bottom of said radiation boiler above said water bath but at least partially below the lower end of the innermost heat exchange element whereby gas which strikes the conical surface of said conical deflector is deflected and passes through said at least one annular passage and in the passage of the innermost heat exchange element.

2. A radiation boiler according to claim 1, wherein said conical deflector tapers upwardly.

3. A radiation boiler according to claim 1, wherein said boiler further comprises a nozzle system including nozzles connected to a fluid feed, wherein the nozzles are directed toward the upper surface of said conical deflector whereby when fluid is passed through said nozzles, material accumulating on the surface of said deflector is washed off into said water bath.

4. A radiation boiler according to claim 1, further comprising nozzles directed toward the inner surface of the innermost heat exchange element and in fluid communication with a source of high pressure gas.

5. A radiation boiler according to claim 1, further comprising nozzles directed against the outer wall of the innermost heat exchange element and nozzles directed toward the inner surface of the outermost heat exchange element and in fluid communication with a source of high pressure gas.

6. A radiation boiler according to claim 1, wherein the outermost heat exchange element includes a funnel shaped member at a lower end thereof which descends into said water bath.

7. A radiation boiler according to claim 1, further comprising a nozzle system including nozzles connected to a fluid feed, wherein the nozzles are directed toward the upper surface of said conical deflector whereby when fluid is passed through said nozzles, material accumulating on the surface of said deflector is washed off and into said water bed, nozzles directed toward the inner surface of the innermost heat exchange element and in complete fluid communication with a source of high pressure gas, nozzles directed toward the outer surface of the innermost heat exchange element and toward the inner surface of the outermost heat exchange element and in fluid communication with the source of high pressure gas, said outermost heat exchange element including a funnel shaped member at the lower end thereof which descends into said water bath.

* * * * *